United States Patent [19]

Ramacher

[11] 4,364,222
[45] Dec. 21, 1982

[54] NUT HARVESTING MACHINE

[75] Inventor: Barry Ramacher, Stockton, Calif.

[73] Assignee: Ramacher Manufacturing Company, Linden, Calif.

[21] Appl. No.: 286,923

[22] Filed: Jul. 27, 1981

[51] Int. Cl.³ .................... A01D 51/00; A01D 46/00; B07B 4/00
[52] U.S. Cl. .................... 56/328 R; 56/12.8; 56/13.3; 56/DIG. 8; 209/153; 209/147; 209/139 R
[58] Field of Search ............. 56/328 R, DIG. 8, 12.8, 56/12.9, 13.1, 13.3, 13.4; 198/438, 428; 209/1, 21, 26-29, 466, 492, 639, 643, 645, 136-139 R, 147, 153; 130/27 HF

[56] References Cited

U.S. PATENT DOCUMENTS

| | | | |
|---|---|---|---|
| 1,048,091 | 12/1912 | Nelson | 209/136 |
| 1,400,225 | 12/1921 | Meyer | 209/29 |
| 2,294,086 | 8/1942 | Hinds et al. | 209/147 |
| 2,762,506 | 9/1956 | Fine | 209/139 R |
| 2,931,500 | 4/1960 | Andrew et al. | 209/139 R |
| 3,213,598 | 9/1965 | Olsson | 56/133 |
| 3,227,276 | 1/1966 | Leighton et al. | 209/139 R |
| 3,429,438 | 2/1969 | Palmer et al. | 209/137 |
| 3,442,379 | 5/1969 | Schneider | 209/137 |
| 3,475,889 | 11/1969 | Overstreet et al. | 56/328 R |
| 4,194,346 | 3/1980 | Ingalls | 56/328 R |

*Primary Examiner*—Gene Mancene
*Assistant Examiner*—John Weiss
*Attorney, Agent, or Firm*—Lothrop & West

[57] ABSTRACT

For separating nuts from orchard trash in a windrow, the mixture of nuts and trash is picked up and deposited on the forward end of a foraminous conveyor enclosed by a housing connected to a fan inducing a vigorous flow of air through the conveyor. Variously arranged baffles, walls and guide plates direct the air rearwardly to enhance separation capacity and form settling zones to increase separation efficiency. Provision is also made for abruptly changing the direction of movement of the nut and trash supporting upper run of the conveyor to dislodge and tumble the nuts and the trash as they traverse the separation zone where the flow of air emerges through the upper run, thereby effecting even more rapid and efficient separation.

15 Claims, 3 Drawing Figures

NUT HARVESTING MACHINE

BACKGROUND OF THE INVENTION a. Field of the Invention

The invention relates generally to nut harvesters for collecting nuts directly from the ground and thereafter separating unwanted trash such as leaves, twigs, grass, and fine dirt from the harvested crop.

More specifically, the invention is directed towards a harvester including a more rapid and efficient air flow separator for segregation of the crop from intermixed orchard debris.

b. Description of the Prior Art

The modern nut harvester performs the dual job first of collecting the windrows of nuts and intermixed debris, and then separating the nut units from the debris for immediate return of the latter to the orchard floor. Harvester pick up mechanisms have been improved to the point where efficient windrow collection can be performed at relatively high harvester speeds. However, previous nut and trash separation systems have often proved unable to keep pace with collection mechanism at these higher speeds. As a consequence, the nut and trash separation step continued to be the "bottleneck" of the overall harvesting process.

Nut and trash separation mechanisms which utilize an air flow passing transversely through a perforated conveyor, uplifting and removing the lighter and more aerodynamically responsive trash material, are well known in the art. The conventional scheme calls for a centrifugal fan sufficiently powerful to create a vertical flow passing through a portion of the foraminous conveyor. The trash, carried upwardly from the conveyor and eventually discharged upon the ground, is thereby separated from the relatively heavy nut units. While this approach has worked fairly well, the conveyor must be run slowly to ensure that all of the debris is removed. If the air flow rate is increased in an effort to speed the separation process, a considerable number of nuts will be carried away with the debris and lost through the harvester's waste discharge.

SUMMARY OF THE INVENTION

The nut and trash separator embodied in the harvester disclosed herein includes a number of features specifically directed towards increasing the speed of material separation while maintaining a low or negligable rate of nut loss in the process. Two embodiments of the invention are disclosed, both of which employ a settling zone for redeposit upon the conveyor system those nuts which have become airborne within the air flow activated separation zone. The recapture of these suspended nuts ensures that crop loss through the trash or debris discharge port will be minimized.

The settling zones of both embodiments operate in substantially the same manner. The heavier and less aerodynamically responsive nuts descend from the generally horizontal air flow within the settling zone to rejoin the conveyor. However, the two embodiments differ in the particular placement of their respective settling zones.

In the first version, the settling zone overlies the foraminous supply conveyor at a point "upstream" from a first separation zone. In other words, the recaptured nuts are redeposited upon the crop and trash mixture on the conveyor before the mixture reaches the first separation zone. These nuts, in effect, are resubjected to the separation process.

The second version is an adaptation of the settling zone principle to a more conventional air flow separator. Here, the settling zone also overlies the conveyor, but at a point "downstream" from the separation zone. Therefore, the airborne nuts resettle upon the conveyor after the separation zone, rejoining those nuts already separated from the debris. However, both embodiments rely upon gravity and the aerodynamic response of nut units within a generally horizontal air flow to effect separation and nut settling.

A second important feature centers upon the direction of air flow within the separation zone. A vigorous air flow is applied directly beneath selected portions of the nut harvester's foraminous supply conveyor, lifting and removing unwanted trash. This air flow is guided by air dams, air seals, and an air baffle to pass through the crop-trash mixture in generally the same direction as that of the mixture as it advances through the harvester. Transport of the mixture upon the harvester's conveyor is thereby air-flow assisted, augmenting the rate at which the harvester can first collect the windrows and then, secondly, separate the crop from the trash.

Lastly, the path of the supply conveyor is sharply and downwardly diverted at the selected separation zones to tumble the mixture. This tumbling effect acts to expose new portions of the mixture to the subjacent air flow passing upwardly through the foraminous conveyor, thereby enhancing the separation process.

BRIEF DESCRIPTION OF THE DRAWING FIGURES

DETAILED DESCRIPTION OF THE PREFERRED EMBODIMENT

Figure 1:
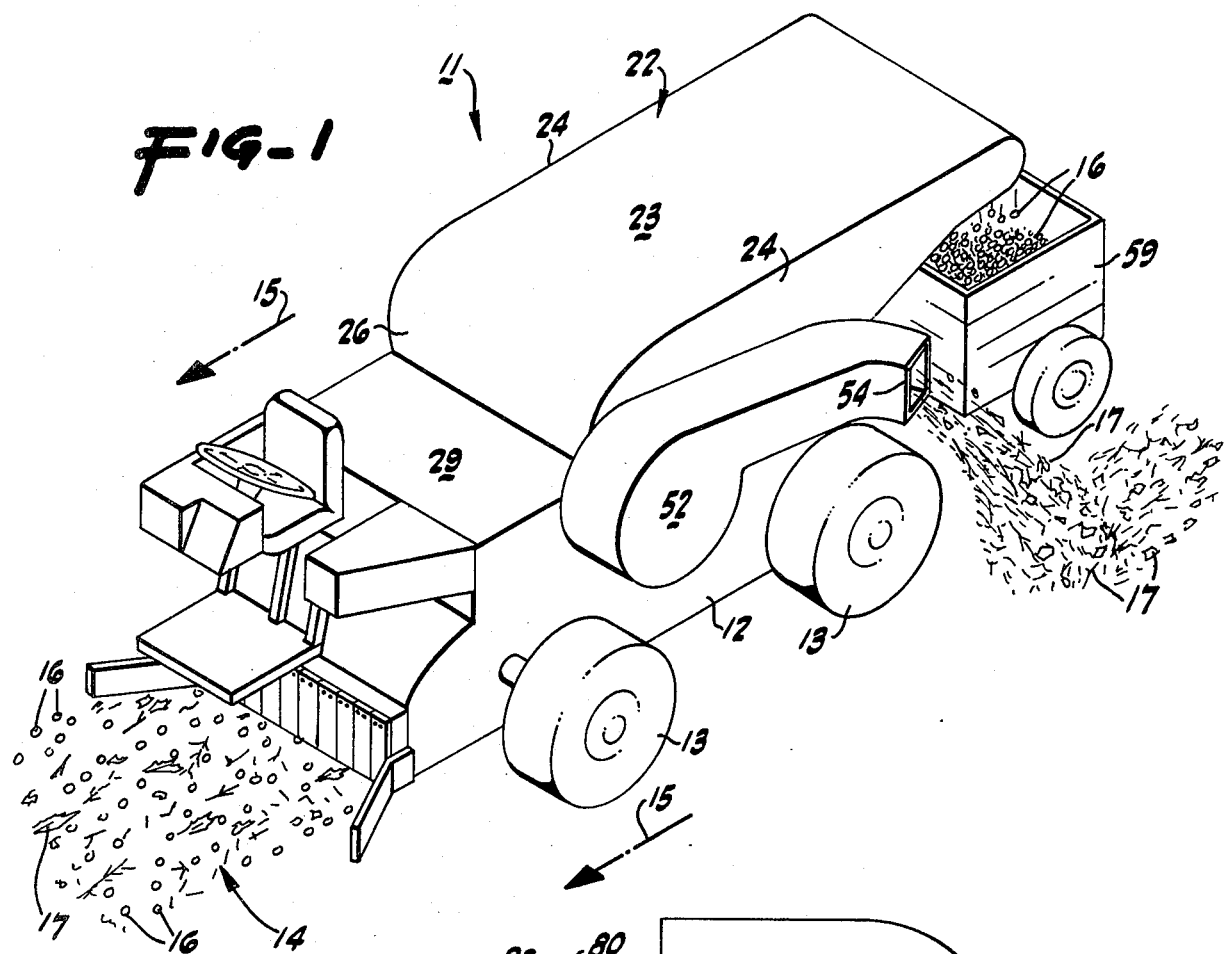
FIG. 1 is a left front perspective of a nut harvester embodying the invention herein.

With particular reference to FIG. 1, the harvester of the invention 11 includes an elongated fore and aft frame 12 supported by ground engaging wheels 13 of conventional design for transport through the orchard. The operator typically directs the harvester 11 into fore and aft alignment with a previously formed windrow 14 to initiate the harvesting process. The windrow 14 includes a mixture of nuts 16, or nuts units, and debris 17, or trash. The debris 17 may have leaves, twigs, grass, and relatively fine dirt particles included therein, depending upon the nature and condition of the particular orchard.

As the harvester 11 advances along the windrow 14 in a direction indicated by the arrow 15, a pick up mechanism (not shown), located adjacent the forward end of the harvester 11, collects the nuts and trash from the ground. The pick up mechanism deposits the mixture upon the forward, ingress end 18 of a foraminous, fore and aft conveyor 19 within the harvester 11 (see FIG. 2).

While the pick up, or collection, mechanism may be of any suitable construction the harvester pick up mechanism disclosed in my U.S. Pat. No. 3,872,657, issued Mar. 25, 1975, has proven to be eminently satisfactory in performing rapid, yet complete collection of the windrow mixture.

The fore and aft conveyor 19 includes a plurality of transverse flights 21 which successively engage respective portions of the mixture (see FIG. 2) and transport them up an inclined portion of the conveyor 19 into the harvester housing 22. The housing 22 generally surrounds the middle portion of the conveyor 19, and includes a roof 23, a pair of opposing vertical side walls 24, a curved forward wall 26, an after floor section 27 and a forward floor section 28. A forward cover 29 abuts the forward wall 26 and encloses the pick up mechanism and the ingress portion 18 of the conveyor 19 (see FIGS. 1 and 2).

The housing 22 encloses and generally defines a separation chamber 25.

Figure 2:
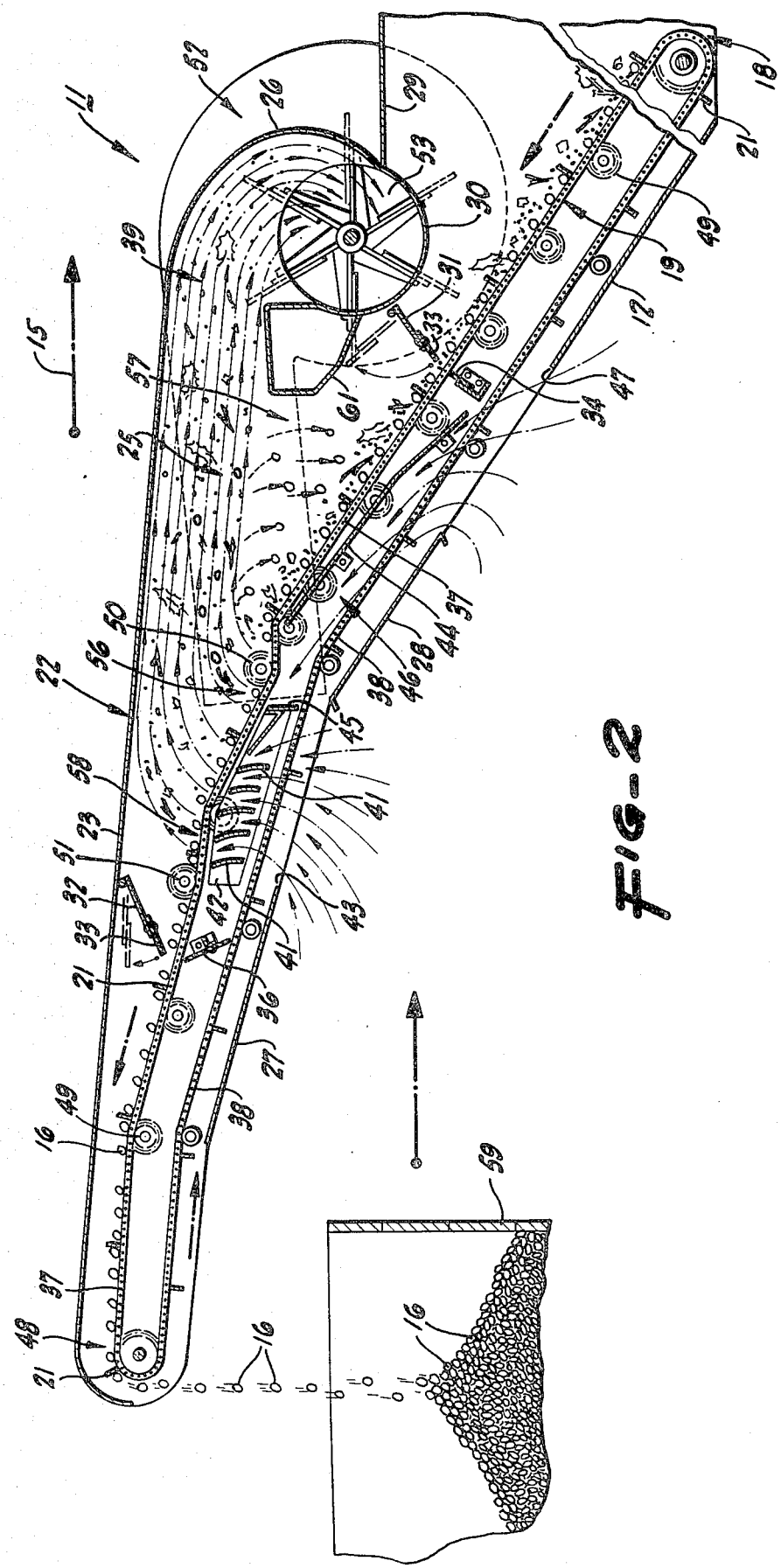
FIG. 2 is a median, vertical, longitudinal, cross-sectional view of a preferred embodiment of the nut harvester, showing the general air flow pattern and travel path of the nut and trash mixture; and, FIG. 3 is an alternative embodiment of the invention, adapting the settling zone principle to an air flow trash separator of a more conventional design.

A pivoted, forward air dam 31 extends transversely between the vertical side walls 24, forming an adjustable air passage between the fan inlet tube 30, or casing, and the upper surface of the conveyor 19. In like fashion, a pivoted, rearward air dam 32 extends transversely between the vertical side walls 24 and forms an adjustable air passage between the roof 23 and the upper surface of the conveyor 19. Each air dam includes a respective, rubberized distal edge 33 to produce a reasonably tight but yieldable air seal with the conveyor 19 and the flights 21 when the dams are placed in their lowered, closed position, as shown in FIG. 2. The function and selective operation of the air dams 31 and 32 will be explained in greater detail herein.

Also extending between the vertical side walls are front and rear stationary air seals 34 and 36, respectively. The air seals are interposed between the upper run 37 and the lower run 38 of the conveyor 19, and act to block air from passing from the space between the conveyor runs into the plenum 39 at undesirable locations.

A plurality of arcuate vanes 41, or air deflectors, extends transversely between a pair of lateral plates 42 attached to the opposing inner surfaces of the two side walls 24. The vanes 41 are directed upwardly and rearwardly, as illustrated in FIG. 2, and are disposed immediately above a rear vent 43 defined by a separation between the after floor section 27 and the forward floor section 28.

An inclined baffle plate 44 is coextensive with and subjacent a middle portion of the conveyor's upper run 37. The forward lower end of the baffle plate 44 is more steeply inclined to terminate adjacent the lower end of the forward air seal 34. A duct 46 is thereby formed with the subjacent forward floor section 28, the forward lower end of the duct 46 being in communication with a forward vent 47 formed by an interruption in the forward floor section 28, the upper end leading through the upper conveyor run 37 and then into the plenum 39. A transverse deflector plate 45 spanning the forward end of the lateral plates 42 assists in directing the flow of air in the duct 46 upwardly and rearwardly through the upper run 37 of the conveyor 19.

The conveyor 19 begins with a fairly steep inclination at its ingress end 18, progresses to a more horizontal attitude in its intermediate portion, and finally assumes an almost horizontal posture at its egress end 48.

The lateral extremities of the conveyor 19 are supported by a plurality of free rolling sprockets 49. While the sprockets 49 are in conventional supporting engagement beneath the upper and lower runs of the conveyor, a forward diversion sprocket 50 and an after diversion sprocket 51 are located above the upper run 37 and act sharply to direct the path of the upper run downwardly at two critical positions (see FIG. 2). The manner in which this rapid, downward diversion of the upper run 37 of the conveyor cooperates with the rising air flow to effect improved separation will be explained more fully herein.

A fan 52 includes a suction port 53, in communication with the forward end of the plenum 39, and a discharge port 54 (see FIG. 1), directed away from the harvester 11. When actuated, the fan 52 creates an evacuated condition within the plenum 39, thereby establishing two primary air flow channels, one passing through the forward vent 47 and the other passing through the rear vent 43, both flowing into the plenum 39.

As the harvester 11 proceeds along its path over the windrow 14, the collected mixture is passed up the foraminous conveyor 19 and first encounters an uplifting and rearwardly directed air flow passing through the conveyor from the duct 46. Simultaneously, the upper run 37 is sharply detoured, or diverted, downwardly by the first diversion sprocket 50. As a result the mixture is suddenly unsupported and is tossed and tumbled into the air flow. The relatively heavy nuts 16 tend immediately to resettle upon the surface of the upper run 37 and progress farther in a rearward direction. The debris 17, however, being relatively lighter and more aerodynamically responsive than the nuts, is lifted upwardly and impelled forwardly, by the air currents indicated in FIG. 2, toward the suction port 53.

The rearward direction of the air flow through the duct 46, acting in general concert with the established rearward direction of travel of the mixture, enhances both the speed and the efficiency of the separation process. In other words, a large fraction of the nuts is immediately separated from the trash and continues on its way to the discharge end of the conveyor.

Owing to variations in nut weight and particular position upon the conveyor 19, however, a certain number of nuts will become entrained in the air flow and be carried forwardly toward the suction port 53 along with the debris 17. As indicated in FIG. 2, while the initial vertical updraft within the first, or primary, separation zone 56 is sufficient to uplift some of the nuts, the subsequent horizontal forward path of the air flow cannot support the nuts. Consequently, a settling zone 57, forward from the primary separation zone 56, provides an area, or region, where nuts are "recaptured", and drop out of the dominant horizontal air flow onto the upper conveyor run 37. Since the baffle plate 44 inhibits any upward air currents through the conveyor and into the quiescent settling zone 57, an air current "dead space" ensures that the dropping nuts will merely reenter the crop-trash mixture for subsequent reseparation.

While a large portion of the trash is removed from the conveyor 19 within the primary separation zone 56, a secondary separation zone 58 is provided to ensure that solely nut units 16 will ultimately pass from the discharge end of the conveyor 19 into the collection bin 59.

In the secondary separation zone 58, an air flow passes through the rear vent 43, is directed upwardly and rearwardly by the arcuate vanes 41, and emerges into the plenum 39 after passing through the conveyor 19. The rearward component of the air flow again promotes separation and removal of the debris in the same direction as conveyor travel. Once the debris has been lifted clear of the upper surface of the upper run 37, the air flow and entrained debris 17 make a sharp reversal of direction and, as before, travel forwardly through the plenum 39, eventually entering the settling zone 57. The relatively few nuts 16 which may have become airborne while passing through the second separation zone 58 are recaptured in the settling zone 57 in a manner identical to that previously discussed.

Additionally, the after pair of diversion sprockets 51 on either side of the conveyor 19 thrust the path of the conveyor 19 downwardly within the second separation zone 58. This abrupt detour in the conveyor's path tumbles and rolls the mixture and further encourages the separation process, as previously explained.

After passing through the second separation zone 58, only nuts 16 remain upon the conveyor 19. All the trash is removed. These nuts fall off the conveyor's discharge end 48 and drop into the collection bin 59, normally towed behind the harvester as shown in FIG. 1. The debris 17 passes over the inlet tube extension 61 and into the suction port 53, and then is discharged through port 54 onto the ground. The inlet tube extension 61 also serves to deflect any forwardly traveling nuts back upon the upper conveyor run 37.

The harvester 11 may encounter a variety of orchard conditions, and each condition may call for variation in the operation of the separator mechanism.

For instance, nut varieties differ in average weight, the crop or debris may be unusually heavy, or the collected mixture could be damp. During the early part of the harvesting season, the relatively light nuts being harvested at the time would call for the air dams 31 and 32 to be open, allowing air to flow into the plenum 39 through secondary air channels overlying the upper run 37. By providing these additional air flow channels, the velocity of the air through the first and second separation zones is reduced, decreasing the chance of crop loss through the discharge port 54. If the nut unit weight is extremely light, the speed of the fan 52 can be decreased as a further measure to eliminate nut loss.

On the other hand, if either the crop or debris is heavy or damp, such as would be common during the latter part of the harvesting season, maximum air flow through the primary flow channels would be required. By closing the air dams 31 and 32 so their respective distal edges 33 are adjacent the upper surface of the upper track 37, the air flow with the first and second separation zones will be maximized, resulting in optimum separation of nuts and debris under these particular conditions.

Figure 3:
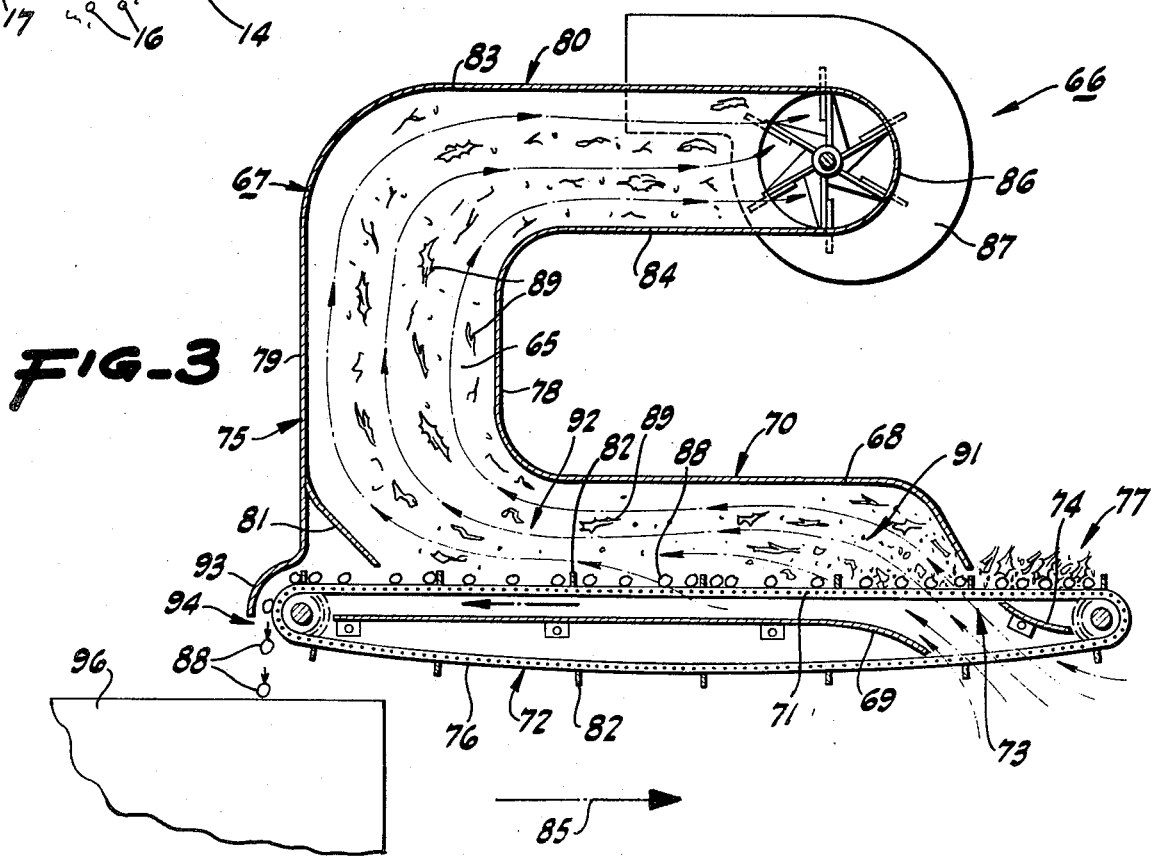

An alternative embodiment of the invention, showing the application of the settling zone concept to a more conventional air flow separator, is illustrated in FIG. 3. The air flow separator 66 would typically be structurally integrated with a harvester pick up mechanism (not shown), such as that already described for the preferred embodiment of the invention. For purposes of clarity, all objects and structural elements herein will be designated with different numerals than those already assigned for similar objects and elements within the preferred embodiment.

The separator 66 generally includes a U-shaped housing 67, defining an enclosed air flow channel 65 within which nut and debris separation occurs.

A lower, horizontal leg 70 of the housing 67 includes an upper air guide wall 68 and a lower air guide plate 69. The lower guide plate 69 is subjacent, parallel, and generally coextensive with the upper run 71 of a foraminous conveyor 72, as shown in FIG. 3. The forward ends of both the upper guide wall 68 and the lower guide plate 69 are inclined downwardly to define an air inlet port 73. A blocking plate 74 is positioned between the upper run 71 and the lower run 76, and extends the transverse dimension of the conveyor 72. The blocking plate 74 effectively prevents air from passing downwardly into the air inlet port 73 from the forward, loading end 77 of the conveyor.

A vertical, intermediate leg 75 includes a forward wall 78 and a rear wall 79. A curved, air deflection plate 81 is attached to the lower, inner surface of the rear wall 79 and extends the full width of the conveyor 72. The lower edge of the plate 81 just clears the cleats 82 of the conveyor 72.

An upper, horizontal leg 80 has a roof 83 and a floor 84, the forward ends of which terminate in a fan inlet conduit 86. An exhaust fan 87, in turn, is interconnected to the inlet conduit 86.

In operation, with the harvester moving in a direction indicated by the arrow 85, the pick up mechanism deposits the mixture of nuts 88 and debris 89, or trash, upon the loading end 77 of the conveyor 72. The exhaust fan 87 draws air from the upper, forward end of the housing 67, producing an air flow passing into the air inlet port 73 through the foraminous conveyor 72 and thence through the legs 70, 75, and 80. The inclination of the forward ends of the upper guide wall 68 and the lower guide plate 69, coupled with the particular placement of the blocking plate 74, directs the air flow upwardly and rearwardly into the separation zone 91. The rearward component of the air flow through the conveyor 72 increases the capacity of the separator 66 to handle heavy or damp mixture of nuts and debris.

The uplifting air entrains the lighter and more aerodynamically responsive debris particles, thereby separating them from the nuts being transported rearwardly upon the upper run 71 of the conveyor. Immediately rearward from the separation zone 91, and extending to the vertical, intermediate leg 75 of the housing 67, is a settling zone 92. Any nuts 88 which initially become entrained in the air flow in the separation zone 91, drop out of the flow and back upon the upper conveyor run in the settling zone 92. The speed of the horizontal air flow within this settling zone 92 is insufficient to maintain the nuts 88 in an airborne state. Thus, virtually all of the nuts have rejoined the upper run 71 as it reaches the deflection plate 81.

The deflection plate 81 directs the air flow upwardly to carry the debris through the remaining portion of the housing 67 for discharge through the exhaust fan 87. A rearwardly and downwardly curved lower lip 93 at the bottom of the rear wall 79 conforms generally to the arcuate discharge end 94 of the conveyor, forming a further air seal to prevent the escape of air needed to remove the trash. The nuts 88, free of unwanted debris, pass off the discharge end 94 of the conveyor and drop into a collector box 96.

Both embodiments of the invention provide enhanced speed of nut separation and increased efficiency under widely variant crop conditions.

I claim:
1. A nut harvesting machine for crop collection and trash separation comprising:
   a. an elongated fore and aft frame mounted on ground-engaging wheels for advancing along a path defined by a windrowed mixture of nuts and orchard trash;

b. a foraminous endless conveyor mounted on said frame in a fore and aft direction, the upper run of said conveyor moving from a forward ingress end to an after egress end;

c. means for picking up and depositing the windrowed mixture on said forward end of said upper run;

d. a housing substantially enclosing said conveyor, said housing including a first air vent and an air outlet and defining a channel for the flow of air from said first air vent to said outlet;

e. a fan having a suction port and a discharge port;

f. means for collecting said fan to said housing to induce the flow of air into said first air vent, through said channel and outwardly through said outlet into said fan, said channel directing air through said upper run in a nut and trash separation zone; and, g. an elongated fore and aft plate below said upper run, said plate forming in conjunction with said housing a fore and aft settling zone with substantially horizontal air flow, said settling zone being of sufficient length to allow any entrained nuts to descend onto said upper run while lighter trash continues beyond said settling zone into said fan and outwardly through said discharge port to return to the ground.

2. A nut harvesting machine as in claim 1 in which said first air vent is located underneath the forward portion of said plate, the lower surface of said plate guiding the flow of air in a rearward and upward direction to emerge through a first one of said separation zones in said upper run of said conveyor, the air flow having a velocity sufficient to lift substantially all of the trash from said upper run, the air flow velocity being insufficient to dislodge the bulk of the nuts which continue on said upper run to discharge at said after egress end.

3. A nut harvesting machine as in claim 2 in which said settling zone is located forwardly of said first one of said separation zones so that the descending nuts are deposited on the upper run of said conveyor ahead of said first one of said separation zones.

4. A nut harvesting machine as in claim 3 including a front stationary air seal spanning the upper and lower runs of said conveyor adjacent the forward end of said plate to help guide the flow of air along said lower surface of said plate in a rearward and upward direction.

5. A nut harvesting machine as in claim 4 including a forward air dam located adjacent the forward portion of said housing and being selectively pivotable between a closed position, in which said forward air dam extends between said housing and the adjacent upper run of said conveyor in order substantially to prevent the flow of air into said housing, and an open position in which outside air can flow into said housing and diminish the air flow in said channel.

6. A nut harvesting machine as in claim 5 including first diversion means for abruptly changing the direction of movement of said upper run of said conveyor in the vicinity of said first separation zone, the abrupt change in direction being effective to dislodge nuts and trash from the supporting conveyor and thereby enhance air flow separation of nuts from trash.

7. A nut harvesting machine as in claim 6 including a second one of said separation zones above the upper run of said conveyor, a rear stationary air seal spanning the upper and lower runs of said conveyor to assist in the flow of air through said second one of said separation zones, and a second air vent in said housing below said second one of said separation zones, said fan inducing the upward flow of air from said second air vent through said upper run of said conveyor to dislodge trash and carry the dislodged trash out of said discharge port to fall on the ground.

8. A nut harvesting machine as in claim 7 including a plurality of arcuate deflector vanes interposed in the air flow between said second air vent and said second one of said separation zones, and second diversion means for abruptly changing the direction of movement of said upper run of said conveyor in the vicinity of said second one of said separation zones.

9. A nut harvesting machine as in claim 8 including a rearward air dam located aft of said second one of said separation zones, said rearward air dam being adjustable to help regulate air flow in said housing.

10. A nut harvesting machine as in claim 1 in which said first air vent is located forward of said plate, the upper surface of said plate guiding the flow of air in a rearward direction over said settling zone above said plate, said housing extending upwardly thence forwardly from the after end of said settling zone and terminating in said fan.

11. A nut harvesting machine as in claim 10 including a nut discharge opening in said housing adjacent said after end of said upper run of said conveyor, said discharge opening being small enough in size to diminish the extent of air loss from said housing through said discharge opening.

12. A nut harvesting machine as in claim 11 including a curved air deflection plate mounted on said housing adjacent the after end of said settling zone, said curved air deflection plate being effective to intercept and redirect into said air flow channel the crop trash separated from the nuts in said settling zone.

13. A mobile nut harvesting machine for crop collection and trash separation comprising:

a. a fore and aft elongated mobile frame;

b. collection means mounted on the forward end of said frame for removing a mixture of nuts and trash from the ground;

c. a foraminous conveyor having a forward ingress end to receive the output of said collection means and an after egress end to discharge the nuts separated from the trash;

d. a fan mounted on said frame, said fan including a suction port and a discharge port;

e. a housing on said frame substantially enclosing said conveyor and defining a separation chamber, said housing including at least one air vent, the roof of said housing overlying said conveyor and including an inlet tube connected to said suction port, the air flow produced by said fan passing from said air vent through said foraminous conveyor to create a separation zone where the trash is uplifted and separated from the nuts, the air flow then passing through an elongated settling zone above said conveyor wherein the trash and nuts are transported in horizontal fashion for a predetermined distance, the nuts dropping from said settling zone upon said conveyor while the trash is carried through said settling zone to said inlet tube and out said discharge port to the ground.

14. A nut harvesting machine as in claim 13 including a first air vent adjacent the egress end of said conveyor, said inlet tube being located adjacent the ingress end of said conveyor, the air flow passing first through said first air vent, upwardly through said conveyor and into said separation zone, the air flow then progressing horizontally and forwardly through said settling zone toward said inlet tube, the airborne nuts dropping from said settling zone upon said conveyor forwardly from said separation zone.

15. A nut harvesting machine as in claim 13 wherein said air vent is adjacent the ingress end of said conveyor, and said inlet tube is adjacent the egress end of said conveyor, the air flow passing first through said air vent, upwardly and rearwardly through said conveyor and into said separation zone, the air flow then progressing horizontally and rearwardly through said settling zone toward said inlet tube, the airborne nuts dropping from said settling zone upon said conveyor rearwardly from said separation zone.

* * * * *

UNITED STATES PATENT AND TRADEMARK OFFICE
CERTIFICATE OF CORRECTION

PATENT NO. : 4,364,222
DATED : December 21, 1982
INVENTOR(S) : Barry Ramacher

It is certified that error appears in the above—identified patent and that said Letters Patent is hereby corrected as shown below:

Column 7, line 13, "collecting" should read -- connecting --.

Signed and Sealed this

Twenty-second Day of February 1983

[SEAL]

Attest:

Attesting Officer

GERALD J. MOSSINGHOFF
Commissioner of Patents and Trademarks